US007528697B2

(12) United States Patent
Hatanaka et al.

(10) Patent No.: US 7,528,697 B2
(45) Date of Patent: May 5, 2009

(54) EDGE SERVER FAILOVER

(75) Inventors: Iwao Hatanaka, Acton, MA (US); Kenneth R. Traub, Lexington, MA (US)

(73) Assignee: BEA Systems, Inc., Redwood Shores, CA (US)

( * ) Notice: Subject to any disclaimer, the term of this patent is extended or adjusted under 35 U.S.C. 154(b) by 46 days.

(21) Appl. No.: 11/756,000

(22) Filed: May 31, 2007

(65) Prior Publication Data

US 2007/0296550 A1    Dec. 27, 2007

Related U.S. Application Data

(60) Provisional application No. 60/829,921, filed on Oct. 18, 2006, provisional application No. 60/812,397, filed on Jun. 9, 2006, provisional application No. 60/812,460, filed on Jun. 9, 2006.

(51) Int. Cl.
*H04B 17/00* (2006.01)
(52) U.S. Cl. ...................... 340/10.1; 709/227
(58) Field of Classification Search ............... 340/10.1, 340/10.2, 572.1; 235/451; 711/114; 709/227, 709/238, 213, 206, 201
See application file for complete search history.

(56) References Cited

U.S. PATENT DOCUMENTS

| 5,892,441 | A   |   | 4/1999  | Woolley et al. |
|-----------|-----|---|---------|----------------|
| 7,205,897 | B2  |   | 4/2007  | Lin            |
| 2003/0158795 | A1 |   | 8/2003  | Markham et al. |
| 2005/0139665 | A1 |   | 6/2005  | Sato           |
| 2005/0228947 | A1 | * | 10/2005 | Morita et al. ............... 711/114 |
| 2005/0252971 | A1 | * | 11/2005 | Howarth et al. ............. 235/451 |
| 2005/0257213 | A1 |   | 11/2005 | Chu et al. |
| 2005/0258956 | A1 |   | 11/2005 | Neuwirth |
| 2006/0049250 | A1 |   | 3/2006  | Sullivan |
| 2006/0124738 | A1 |   | 6/2006  | Wang et al. |

OTHER PUBLICATIONS

International Search Report for PCT/US07/70526, dated Sep. 9, 2008, 6 pages.
International Search Report for PCT/US07/70532, dated Oct. 16, 2008, 6 pages.

* cited by examiner

*Primary Examiner*—Brian A Zimmerman
*Assistant Examiner*—Nabil H Syed
(74) *Attorney, Agent, or Firm*—Fliesler Meyer LLP

(57) ABSTRACT

First and second RFID edge servers can interact with RFID tag readers. The first and second RFID edge servers can arbitrate which of the first and second RFID edge servers will be active upon start up or edge server failure.

18 Claims, 3 Drawing Sheets

EDGE SERVER FAILOVER

CLAIM OF PRIORITY

This application claims priority to U.S. Provisional Application No. 60/812,397 entitled "Edge Server" by Traub et al., filed Jun. 9, 2006; and U.S. Provisional Application No. 60/812,460 entitled "Enterprise Server" by Traub et al., filed Jun. 9, 2006; and U.S. Provisional Application No. 60/829,921 entitled "Edge Server Failover" by Traub et al., filed Oct. 18, 2006; which are hereby incorporated by reference.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

BACKGROUND OF INVENTION

The present invention relates to Radio Frequency Identification (RID) edge Servers. RFID Tags are becoming more and more popular as a way of tracking objects. Typically, as shown in FIG. 1, an RFID tag 102 is read by an RFID reader 104. The RFID data can then be transferred from the RFID reader 104 to an RFID edge server 106 that can process the RFID data.

The RFID edge server 106 can send the RFID data to central server, such as RFID enterprise server 108.

DETAILED DESCRIPTION

Figure 1:
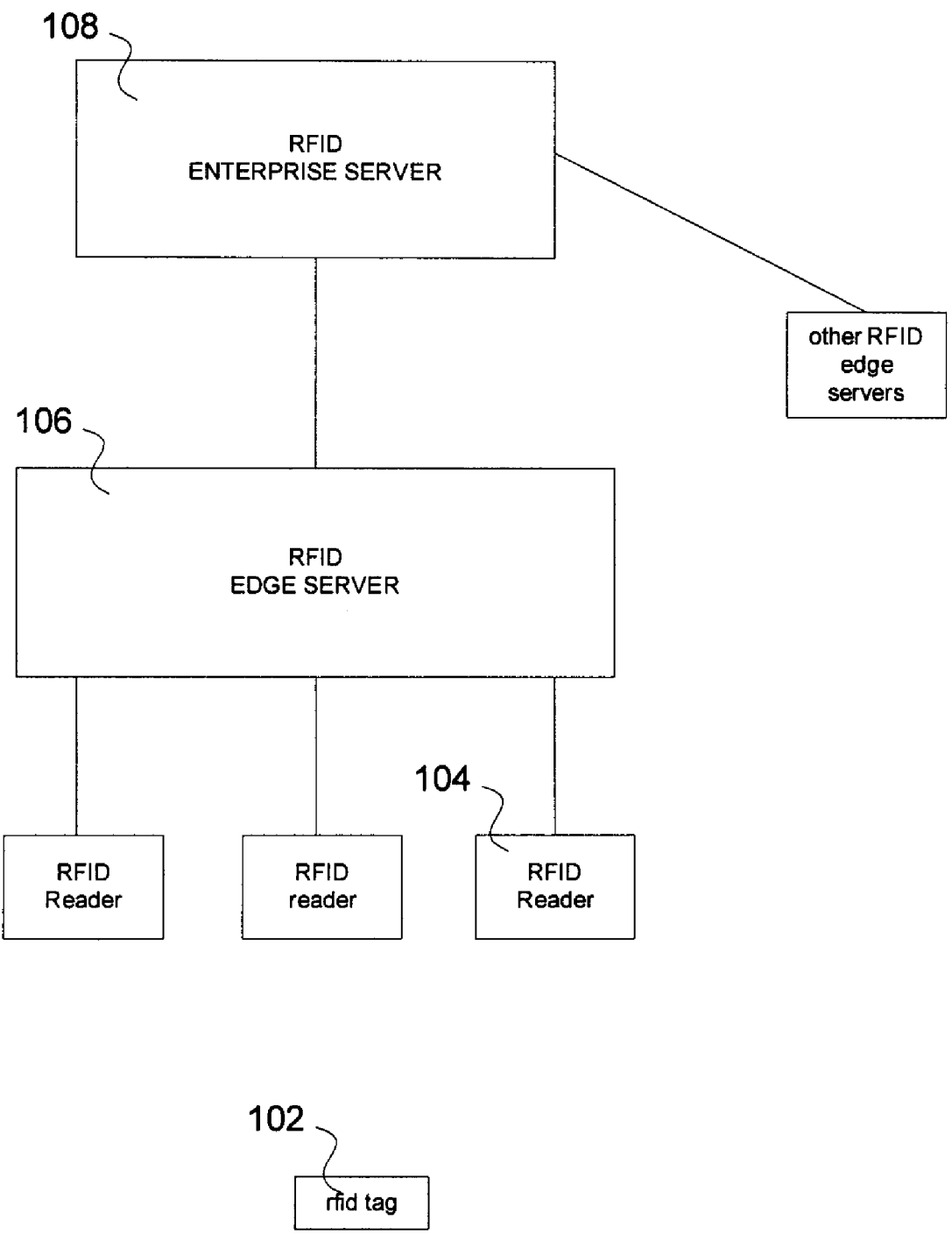
FIG. 1 illustrates an RFID system.

One potential problem with the RFID system of FIG. 1 is that if the RFID edge server 106 goes down the RFID tag 102 can not be tracked.

Figure 2:
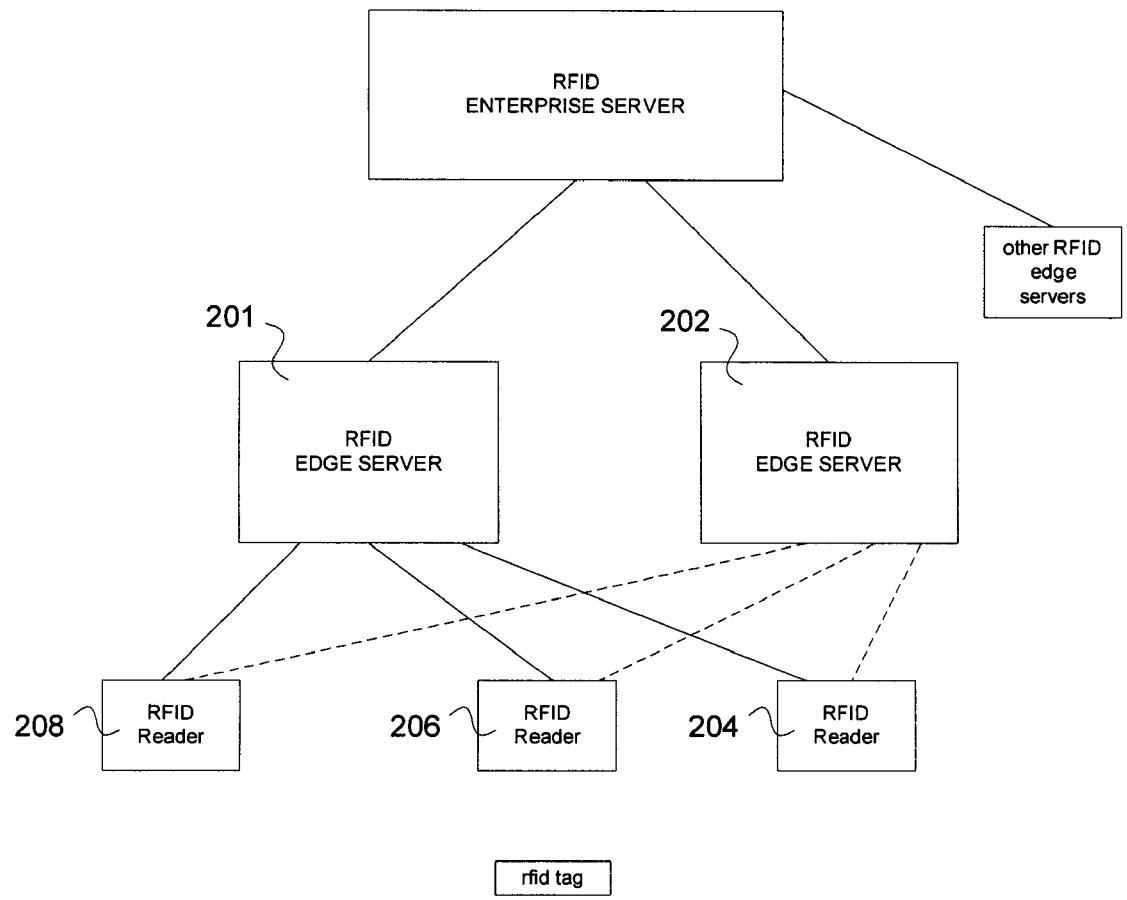
FIG. 2 illustrates an RFID system with edge server failover of one embodiment of the present invention.

FIG. 2 shows a system where RFID server 202 provides for failover for a RFID edge server 210. The RFID edge servers 201 and 202 can determine what RFID edge server should be connected to the RFID readers 204, 206 and 208. The other RFID edge servers can drop any of their connections to any of the RFID readers 204, 206 and 208.

One embodiment is a system comprising a first RFID edge server 201 and a second RFID edge server 202 that arbitrate which RFID edge server will be active.

Upon start up the first and second RFID edge server 201 and 202 can race to get RFID readers, then the RFID server with the least number of RFID readers can give up the RFID readers that it does have. In this way, the winning RFID server will be connected to all of the RFID readers.

Automatic failover of the RFID edge servers 201 and 202 can be done. Reader connections can be reset during failover.

The first RFID edge server can be associated with a failover agent that receives heartbeats from both the first and second RFID edge servers 201 and 202.

The failover agent can be a software component that starts, stops, and monitors the health of an application, and takes corrective actions to regain application availability upon failure.

Failover can be a backup operation that automatically switches to a standby server if the primary system fails or is shutdown. The system can be high availability such that it remains available despite the failure of one's components.

The failover agent or other code can receive heartbeats from first and second RFID edge servers 201 and 202; and arbitrate which of the first and second RFID edge servers 201 and 202 will be active. Upon start up the first and second RFID edge server 201 and 202 can race to get RFID readers 204, 206 and 208, and then arbitrate who will be connected to all of the RFID readers.

An administrator of a system running the RFID edge server can set up the system so that a primary RFID edge server can failover to a secondary RFID edge server if the primary edge server fails or is shutdown. Automated failover support for the RFID edge server can allow for continuous and uninterrupted operations.

The failover solution can entail the following:

Failover agents deployed for each RFID edge server

Figure 3:
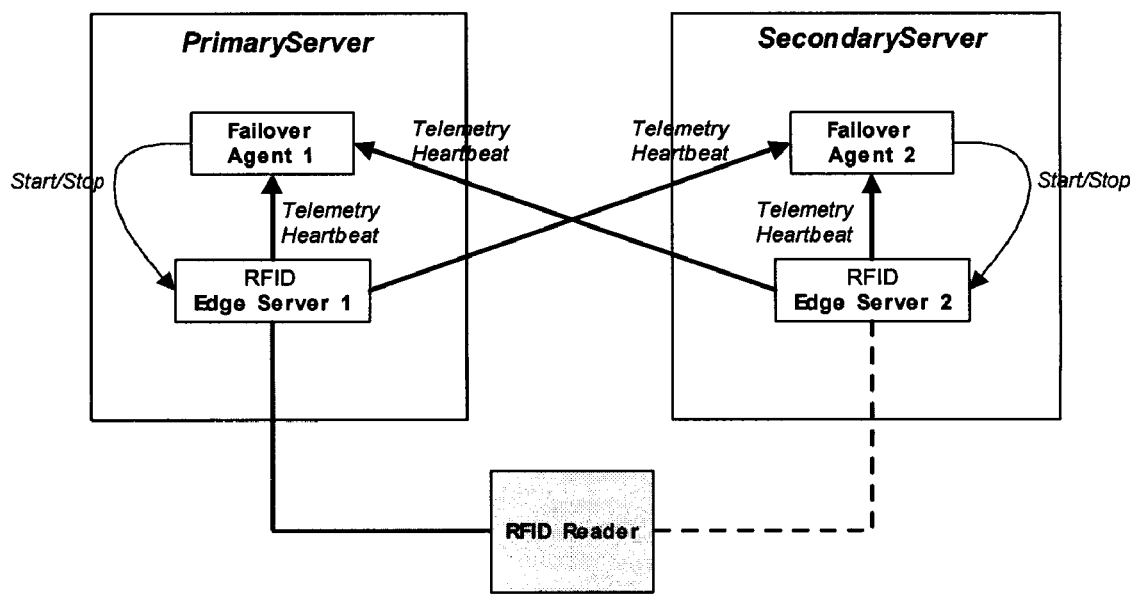
FIG. 3 illustrates a failover system for an RFID system of one embodiment of the present invention.

Automatic failover of primary RFID server to secondary RFID server upon detection of edge server failure Decision algorithm utilized by failover agent to determine which edge server to start/stop RFID Reader connections re-established with edge server during failover processing FIG. 3 shows a primary and secondary server each run an RFID Edge Server and a Failover Agent. Upon startup, each server can launch the failover agent. The failover agent determines whether or not to start the RFID server on that server based on telemetry heartbeats received from both RFID edge server instances.

Each failover agent can receive telemetry heartbeats from both RFID Edge Servers. Based on a decision algorithm documented, such as that below, one of the failover agents can start its RFID edge server instance. The RFID edge server instance can connect to all of the configured RFID readers and generate Electronic Product Code Information Service (EPCIS) event data.

The failover agent can utilize the following, or an alternate, decision algorithm upon receiving a telemetry heartbeat or upon a timer pop at a configured interval: The arbitration can include a down state, an up state and a partial (½) up state.

In one case:

|  | Server1 DOWN State | Server1 partial (½) UP State | Server1 UP State |
|---|---|---|---|
| Server2 DOWN State | FOA1 starts RFTagAware1 | FOA1 starts RFTagAware1 | FOA1 starts RFTagAware1 |
| Server2 partially (½) UP State | FOA1 stops RFTagAware1 | FOA1 starts/stops RFTagAware1 | FOA1 starts RFTagAware1 |
| Server2 UP State | FOA1 stops RFTagAware1 | FOA1 stops RFTagAware1 | [RFTagAware1 is up temporarily] |

DOWN State: No telemetry heartbeat has been received in the last n seconds

Partial (½) UP State: Telemetry heartbeat has been received in the last n seconds, but TelemetryReports indicate <50% of readers are up.

UP State: Telemetry heartbeat has been received in the last n seconds and TelemetryReports indicate >50% of readers are up.

If Server2 is in DOWN state, then failover agent 1 can always try to start RFID edge server.

If Server2 is in UP state, then failover agent 1 will attempt to stop RFID edge server.

If Server2 is in ½ UP state, then failover agent 1 will perform the following:
Stop RFID edge server1 if Server1 is in DOWN state
Start RFTagAware1 if Server1 is in UP state
Start or stop RFID edge server1 if Server1 is in partially ½ UP state ECSpecs, subscriptions, and workflows can be configured ahead of time. The ALE API need not be used during normal operation (other than the delivery of ECReports to existing subscriptions).

An Administration console can display both primary and secondary edge server status (future enhancement would display only the active edge server)

One embodiment may be implemented using a conventional general purpose of a specialized digital computer or microprocessor(s) programmed according to the teachings of the present disclosure, as will be apparent to those skilled in the computer art. Appropriate software coding can readily be prepared by skilled programmers based on the teachings of the present discloser, as will be apparent to those skilled in the software art. The invention may also be implemented by the preparation of integrated circuits or by interconnecting an appropriate network of conventional component circuits, as will be readily apparent to those skilled in the art.

One embodiment includes a computer program product which is a storage medium (media) having instructions stored thereon/in which can be used to program a computer to perform any of the features present herein. The storage medium can include, but is not limited to, any type of disk including floppy disks, optical discs, DVD, CD-ROMs, micro drive, and magneto-optical disks, ROMs, RAMs, EPROMs, EEPROMs, DRAMs, flash memory of media or device suitable for storing instructions and/or data stored on any one of the computer readable medium (media), the present invention can include software for controlling both the hardware of the general purpose/specialized computer or microprocessor, and for enabling the computer or microprocessor to interact with a human user or other mechanism utilizing the results of the present invention. Such software may include, but is not limited to, device drivers, operating systems, execution environments/containers, and user applications.

Embodiments of the present invention can include providing code for implementing processes of the present invention. The providing can include providing code to a user in any manner. For example, the providing can include transmitting digital signals containing the code to a user; providing the code on a physical media to a user; or any other method of making the code available.

Embodiments of the present invention can include a computer implemented method for transmitting code which can be executed at a computer to perform any of the processes of embodiments of the present invention. The transmitting can include transfer through any portion of a network, such as the Internet; through wires, the atmosphere or space; or any other type of transmission. The transmitting can include initiating a transmission of code; or causing the code to pass into any region or country from another region or country. For example, transmitting includes causing the transfer of code through a portion of a network as a result of previously addressing and sending data including the code to a user. A transmission to a user can include any transmission received by the user in any region or country, regardless of the location from which the transmission is sent.

Embodiments of the present invention can include a signal containing code which can be executed at a computer to perform any of the processes of embodiments of the present invention. The signal can be transmitted through a network, such as the Internet; through wires, the atmosphere or space; or any other type of transmission. The entire signal need not be in transit at the same time. The signal can extend in time over the period of its transfer. The signal is not to be considered as a snapshot of what is currently in transit.

The forgoing description of preferred embodiments of the present invention has been provided for the purposes of illustration and description. It is not intended to be exhaustive or to limit the invention to the precise forms disclosed. Many modifications and variations will be apparent to one of ordinary skill in the relevant arts. For example, steps preformed in the embodiments of the invention disclosed can be performed in alternate orders, certain steps can be omitted, and additional steps can be added. The embodiments where chosen and described in order to best explain the principles of the invention and its practical application, thereby enabling others skilled in the art to understand the invention for various embodiments and with various modifications that are suited to the particular used contemplated. It is intended that the scope of the invention be defined by the claims and their equivalents.

What is claimed is:

1. A system comprising:
a first RFID edge server adapted to interact with a RFID tag reader; and
a second RFID edge server adapted to interact with the RFID tag reader, wherein the first and second RFID edge server arbitrate which of the first and second RFID edge servers will be active;
wherein the first and second RFID edge servers are associated with the RFID edge tag reader as well as other RFID tag readers;
wherein the first and second RFID edge servers race to obtain RFID tag readers upon startup;
wherein one of the first or second edge servers who has obtained fewer RFID tag readers, gives up any RFID tag readers it has obtained and puts itself in a down state and the other of the first and second RFID edge servers receives the given up RFID tag readers and puts itself in an up state.

2. The system of claim 1, wherein the first RFID edge server is associated with a failover agent that receives heartbeats from the second RFID edge server.

3. The system of claim 1, an automatic failover of the RFID edge servers occurs between the first and second RFID edge servers.

4. The system of claim 3, wherein reader connections are reset during failover.

5. The system of claim 3, wherein the arbitration includes a down state, an up state and a partially up state.

6. The system of claim 5, wherein a RFID server in the up state has priority over an RFID server in the down state.

7. The system of claim 5, wherein a RFID server in the up state has priority over an RFID server in the partially up state.

8. The system of claim 5, wherein a RFID server in the partially up state will switch control if the other server is in the partially up state.

9. The system of claim 5, wherein upon start up the first and second RFID edge server race to get RFID readers, then arbitrate who will be connected to all of the RFID readers.

10. A system comprising:
   a first RFID edge server adapted to interact with a RFID tag reader; and
a second RFID edge server adapted to interact with the RFID tag reader, wherein the first and second RFID edge server arbitrate which of the first and second RFID edge servers will be active;
   wherein upon start up the first and second RFID edge server race to get RFID readers, then arbitrate who will be connected to all of the RFID readers;
   wherein the first and second RFID edge servers are associated with the RFID edge tag reader as well as other RFID tag readers;
   wherein the first and second RFID edge servers race to obtain RFID tag readers upon startup;
   wherein one of the first or second edge servers who has obtained fewer RFID tag readers, gives up any RFID tag readers it has obtained and puts itself in a down state and the other of the first and second RFID edge servers receives the given up RFID tag readers and puts itself in an up state.

11. The system of claim 10, wherein the first RFID edge server is associated with a failover agent that receives heartbeats from the second RFID edge server.

12. The system of claim 10, an automatic failover of the RFID edge servers occurs between the first and second RFID edge servers.

13. The system of claim 12, wherein reader connections are reset during failover.

14. The system of claim 12, wherein the arbitration includes a down state, an up state and a partially up state.

15. The system of claim 14, wherein a RFID server in the up state has priority over an RFID server in the down state.

16. The system of claim 14, wherein a RFID server in the up state has priority over an RFID server in the partially up state.

17. The system of claim 14, wherein a RFID server in the partially up state will switch control if the other server is in the partially up state.

18. A computer readable storage medium containing code to:
   receive heartbeats from first and second RFID edge servers; and arbitrate which of the first and second RFID edge servers will be active;
   wherein upon start up the first and second RFID edge server race to get RFID readers, then
   arbitrate who will be connected to all of the RFID readers;
      wherein the first and second RFID edge servers are associated with the RFID edge tag reader as well as other RFID tag readers;
      wherein the first and second RFID edge servers race to obtain RFID tag readers upon startup;
   wherein one of the first or second edge servers who has obtained fewer RFID tag readers, gives up any RFID tag readers it has obtained and puts itself in a down state and the other of the first and second RFID edge servers receives the given up RFID tag readers and puts itself in an up state.

* * * * *

UNITED STATES PATENT AND TRADEMARK OFFICE
CERTIFICATE OF CORRECTION

PATENT NO. : 7,528,697 B2
APPLICATION NO. : 11/756000
DATED : May 5, 2009
INVENTOR(S) : Iwao Hatanaka et al.

It is certified that error appears in the above-identified patent and that said Letters Patent is hereby corrected as shown below:

In column 2, line 62, above "DOWN State:" insert -- where: --.

In column 3, line 22, after "server)" insert -- . --.

Signed and Sealed this

Twenty-fifth Day of May, 2010

David J. Kappos
*Director of the United States Patent and Trademark Office*